Feb. 28, 1956  G. L. OLSON  2,736,244
UNIVERSAL ROTARY ANGLE TABLE
Filed March 3, 1953  6 Sheets—Sheet 1
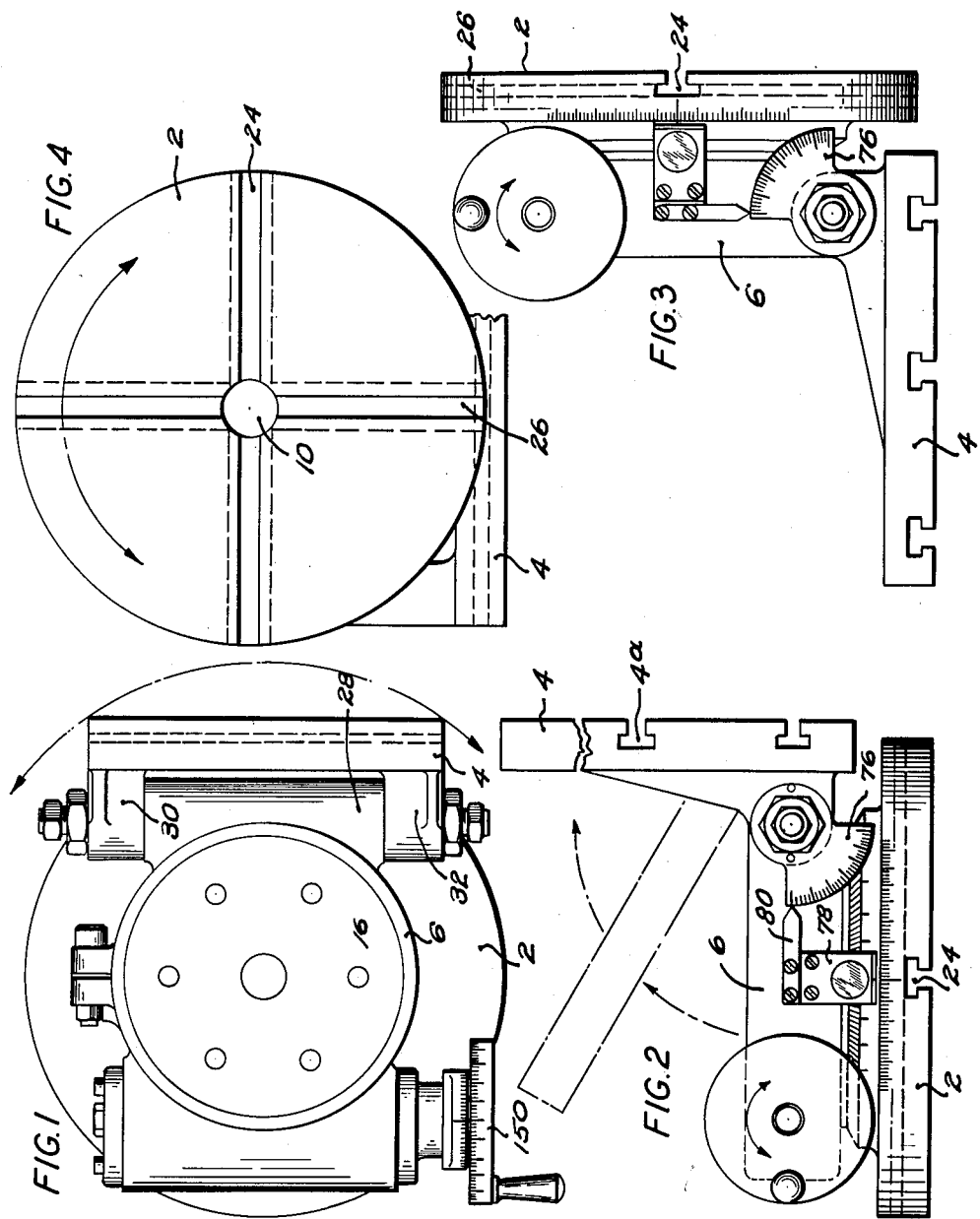
INVENTOR
Gordon L. Olson
by Munroe W. Hamilton
ATTORNEY

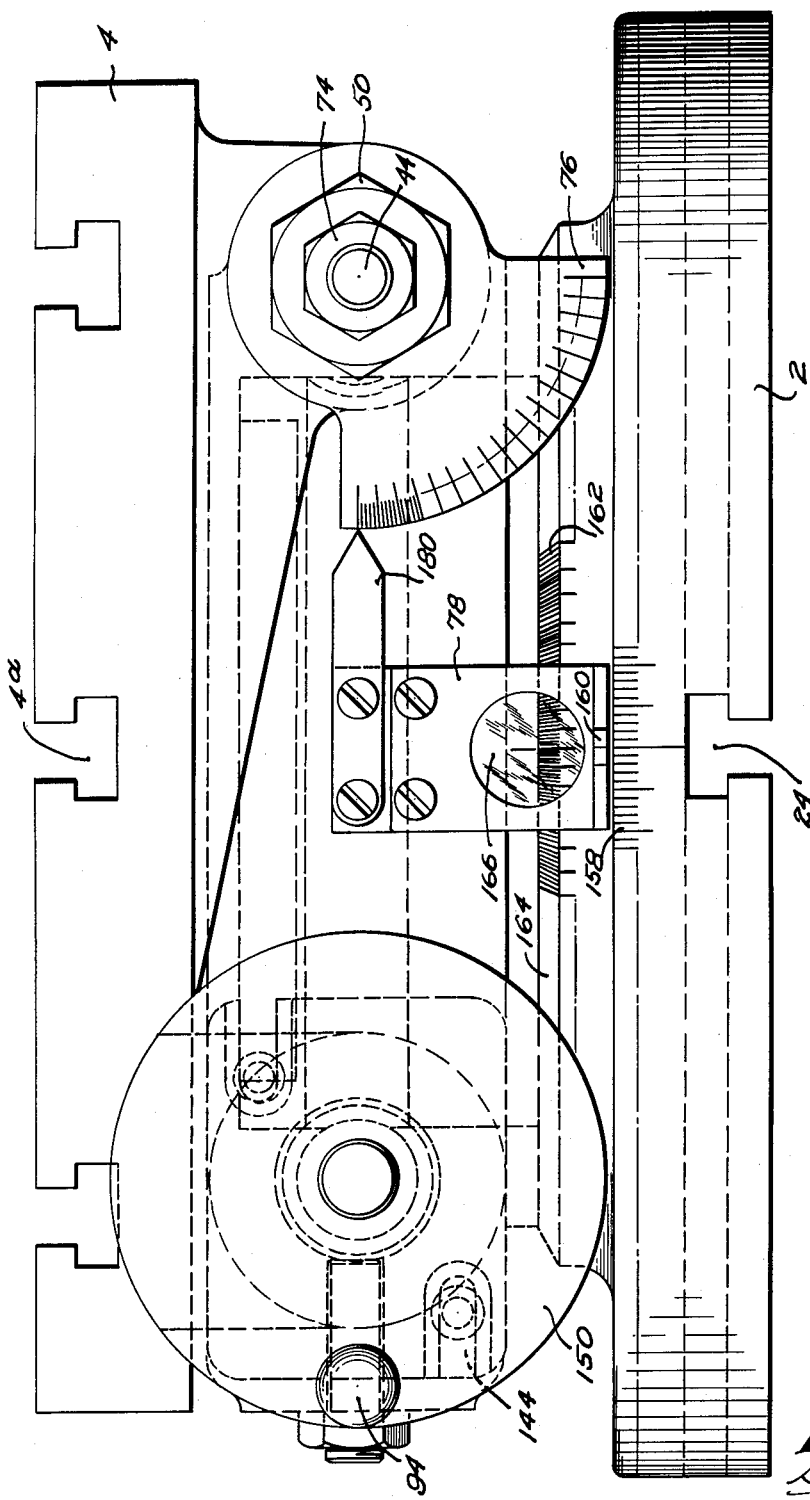

Feb. 28, 1956 G. L. OLSON 2,736,244
UNIVERSAL ROTARY ANGLE TABLE
Filed March 3, 1953 6 Sheets-Sheet 3
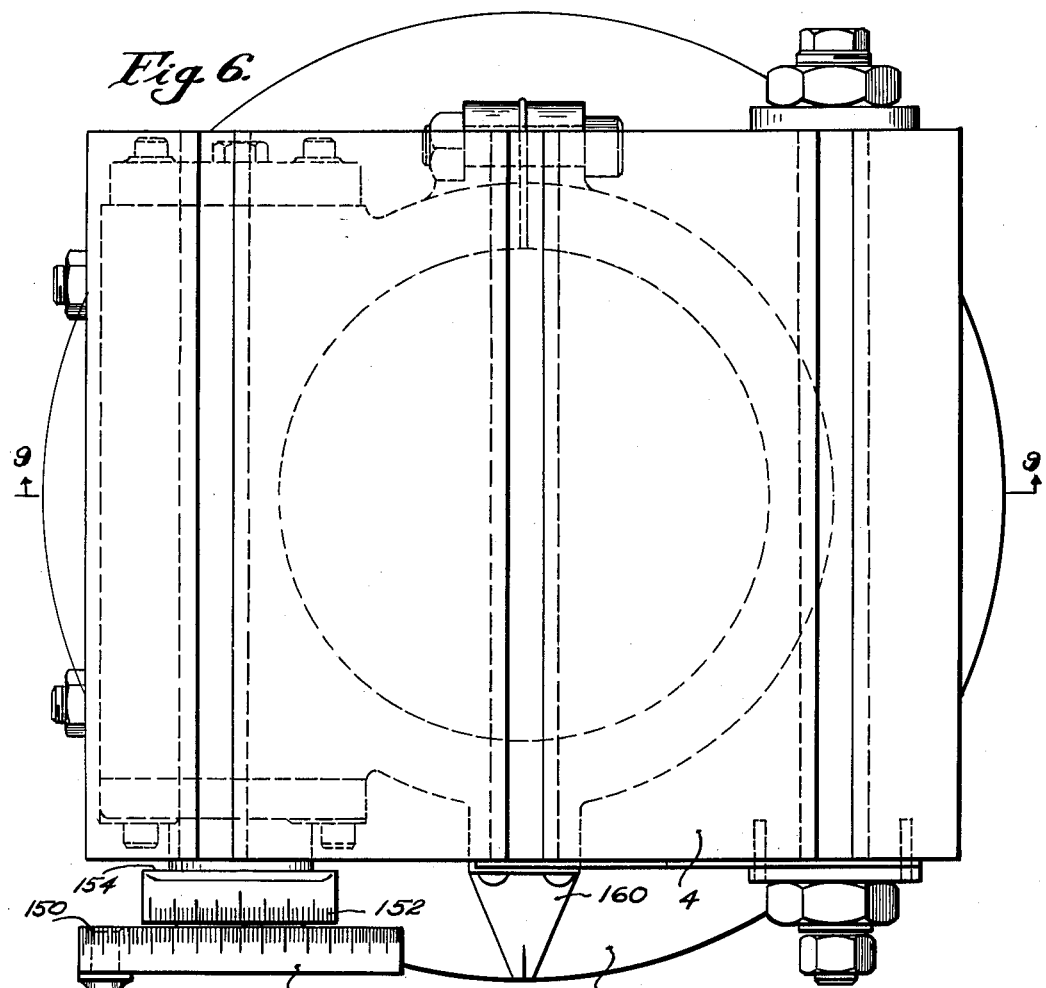
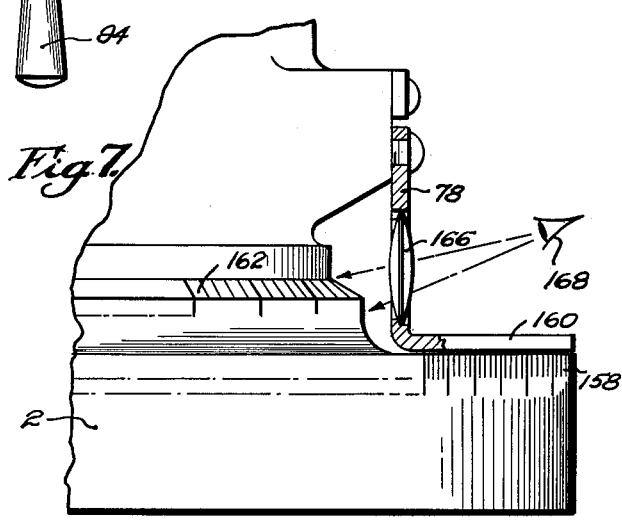
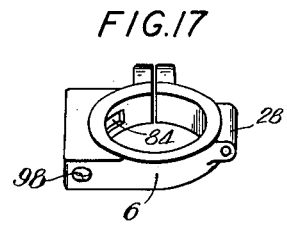
INVENTOR
Gordon L. Olson
BY
ATTORNEY

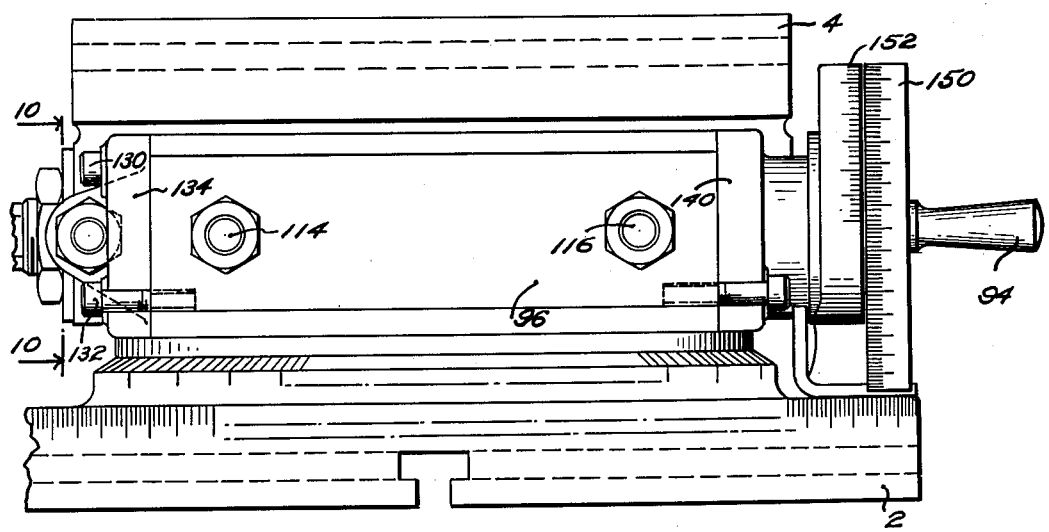
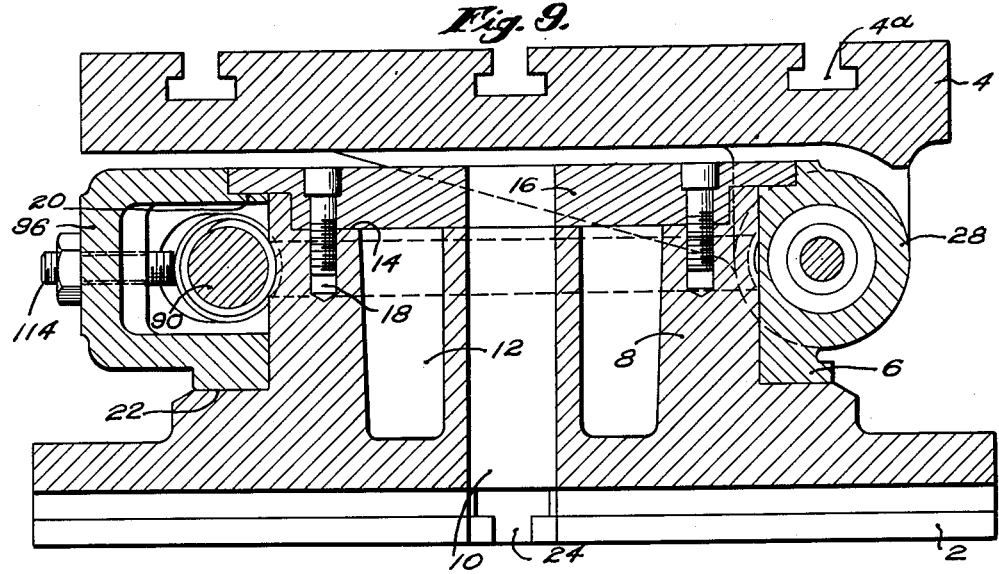
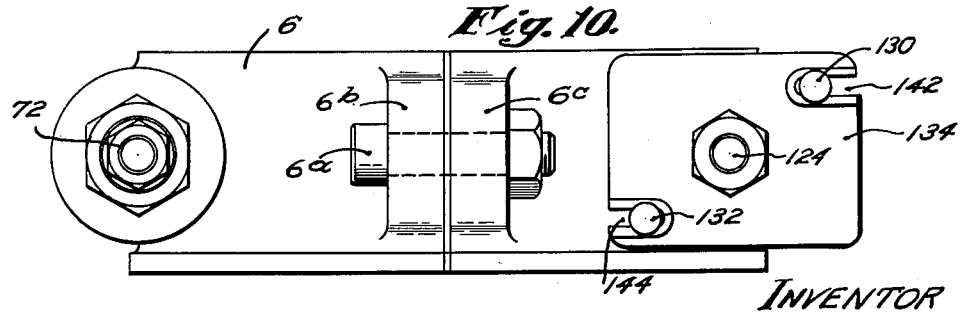

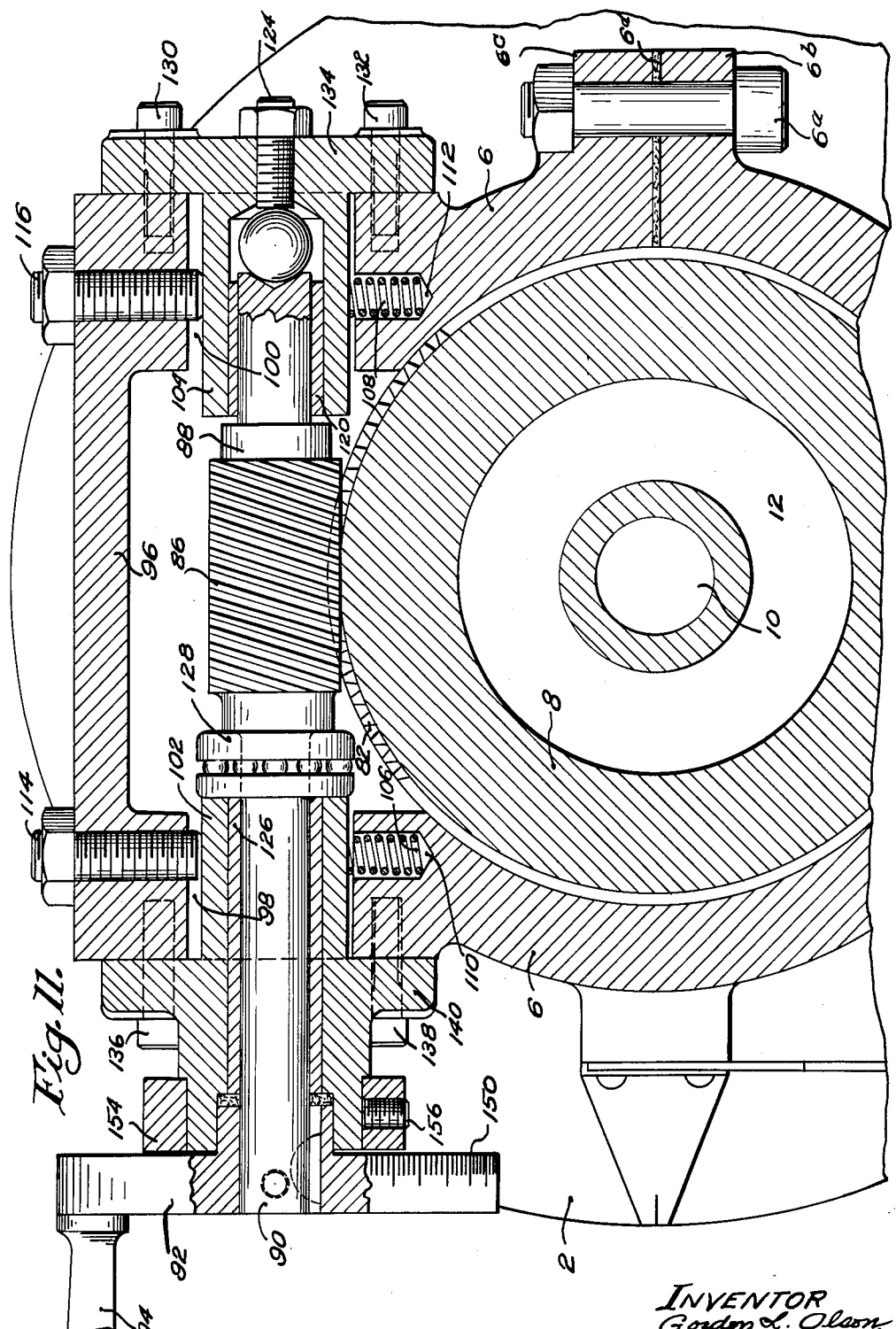

Feb. 28, 1956  G. L. OLSON  2,736,244
UNIVERSAL ROTARY ANGLE TABLE
Filed March 3, 1953  6 Sheets-Sheet 6
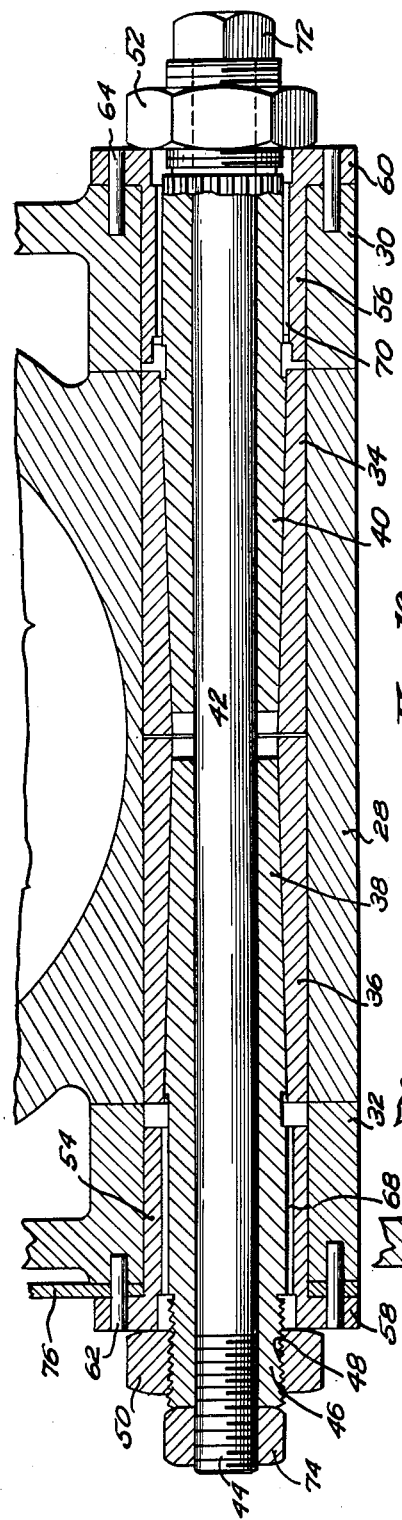
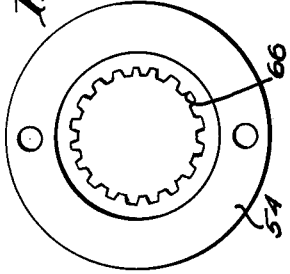
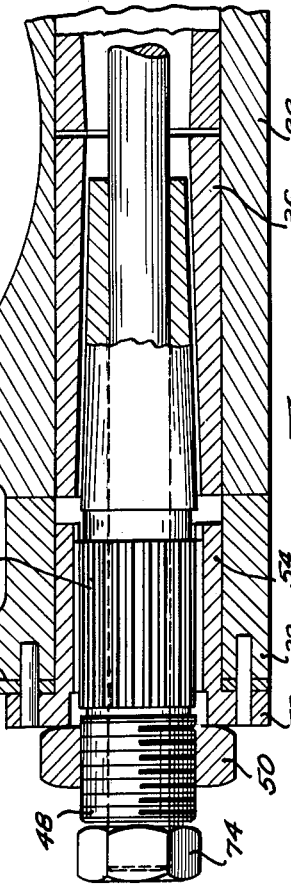
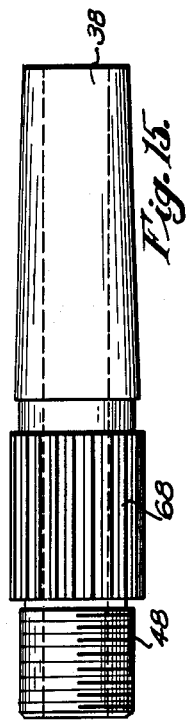
INVENTOR
Gordon L. Olson
by
ATTORNEY United States Patent Office 2,736,244
Patented Feb. 28, 1956

2,736,244

UNIVERSAL ROTARY ANGLE TABLE

Gordon L. Olson, Arlington, Mass.

Application March 3, 1953, Serial No. 340,061

7 Claims. (Cl. 90—59)

This invention relates to an improved work supporting structure which may be employed with machine tools, such as milling machines, drill presses, and the like, and which comprises specifically a novel work holding mechanism including a pair of cooperating work holding elements. The present application is a continuation-in-part of my earlier application Ser. No. 278,733, filed March 26, 1952.

It is an object of the invention to improve work holding devices of the class indicated and to devise a structure which is of relatively simple construction and convenient to use in machine tool cutting operations. The invention also aims to devise a work holding structure which combines the features and structures normally present in both a revolving table and a rotatable angle plate, with a view to increasing and improving the operation of machine tools with which the work support is to be used. It is a further object of the invention to devise a work supporting structure which can be cheaply manufactured, which is easy to assemble and take apart, and which is of extremely rugged construction so that it can undergo continuous use for a long period of time without repair. Still another object of the invention is to devise in an apparatus of the class described means for setting the work supporting elements in precise and extremely accurately determined positions of adjustment.

These and other objects and novel features will be more fully understood and appreciated from the following description of a preferred embodiment of the invention selected for purposes of illustration and shown in the accompanying drawings, in which Fig. 1 is a plan view of my improved work supporting structure viewed in one operation position;

Fig. 2 is a side elevational view of the work supporting structure shown in Fig. 1, and further suggesting an alternate position of adjustment;

Fig. 3 is another side elevational view showing the work supporting structure of the invention in a reversed position with the rotary table element thereof occurring in an angular position of adjustment;

Fig. 4 is an end elevational view showing the work supporting structure in the position suggested in Fig. 3 but viewed from a point directly in front of the rotary table member;

Fig. 5 is an enlarged front elevational view further illustrating details of construction of the work supporting structure as viewed with the upper work supporting element occurring in a horizontally disposed position;

Fig. 6 is an enlarged plan view of the work supporting structure in a position corresponding to that shown in Fig. 5;

Fig. 7 is a detail fragmentary elevational view illustrating viewing means for observing register of the component parts of the device in desired positions of setting;

Fig. 8 is another elevational view of the work supporting structure;

Fig. 9 is a cross-section taken on the line 9—9 of Fig. 6;

Fig. 10 is a detail elevational view of a portion of the structure included within the arrows 10—10 of Fig. 9;

Fig. 11 is a plan cross-section taken approximately on the center line of the worm shaft along its longitudinal axis, with portions of one of the work holding elements being shown in elevation;

Fig. 12 is a continuation of Fig. 11, being taken on the same center line but showing details of the hinged pin construction;

Fig. 13 is another detail fragmentary cross-section of the locking means of the invention showing a section of the hinge pin mechanism in another position of adjustment from that indicated in Fig. 12;

Fig. 14 is a detail end elevational view of a bushing element employed in the adjustment mechanism for the hinge pin shown in Figs. 12 and 13;

Fig. 15 is a side elevational view of tapered locking pin means removed from its bushing;

Fig. 16 is a detail elevational view, partly in cross-section, illustrating a tapered bushing element in which the hinge pin is received; and Fig. 17 is a detail perspective view of an annular support member of the invention.

In general the invention is based upon the novel concept of combining a pair of cooperating work holder elements in such a manner that each of the work holder elements, with the aid of the other, may perform distinct and separate functions which complement one another, and the two work holder elements thus constitute, in effect, a universal workholding apparatus. The structure illustrated in the figures of the drawings above described represents one preferred embodiment of the invention. However, it should be understood that the invention is not intended to be limited to the particular form or parts specified and is capable of embodiment in other structures.

Essentially the preferred embodiment of the structure which has been shown comprises a pair of cooperating work holding elements and means for producing rotative movement of the work holding elements in a manner so chosen that one of the work holding elements may be revolved about its central axis while lying in various positions of angularity with respect to a horizontal plane; or, alternatively, the other of the work holding elements may be rotated about an axis lying outside of itself and also while occurring in various positions of angularity.

In the structure shown in the drawings, and particularly in Figs. 1 to 4, inclusive, the two cooperating work holding elements of the invention have been illustrated in various positions of adjustment and they comprise a table 2 which may be of a circular form, and a plate 4 of rectangular shape, for example. These work holding elements are operatively connected, one to the other, by support means comprising a separate member 6. This member may, for example, consist of a split ring, the ends of which are tightly held by a bolt 6a received through lugs 6b and 6c, better shown in Figs. 11 and 17.

It is pointed out that by means of this arrangement each of the work holding elements may function alternatively as a base or work support. Thus, as generally shown in Figs. 1 and 2, the table 2 may comprise a base, or stationary member, to be bolted, or otherwise secured, to a machine tool, and the plate 4 may then function as a work holder to be arranged in various positions of angular adjustment, as suggested in these figures. As indicated in Figs. 3 and 4, however, the plate 4 may be employed as the base or stationary member which is secured to a machine tool, or other body, and the table 2 may then constitute the work holder and be supported in various positions of angularity. Moreover, in any of these positions the table may be revolved around its own axis.

With this general functioning of the two cooperating work holders in mind, it is convenient to discuss the complete mechanism in detail with one or the other of these work holders assumed to be the stationary or base member, and in Figs. 5 to 12, inclusive, specific details of construction have been shown with the table 2 being considered as the base or stationary body. Considering Figs. 5 and 12 in greater detail, the table 2 is formed with an annular extension 8 which is constructed of a diameter adapted to permit the extension to fit within the split ring 6 when the latter is in a clamped position, as may be better seen from an inspection of Figs. 9 and 11. This annular extension 8 is recessed to form a central opening 10 and an annular well 12, as best shown in Fig. 11. The upper portion of the extension 8, as viewed in Fig. 9, has been recessed to provide a shoulder 14 on which is supported a retaining cap 16 secured by means of bolts 18, as noted. The retaining cap 16 has its outer circumferential edges resting upon a correspondingly shouldered portion 20 of the supporting ring 6 and functions to retain the latter member against a bottom shoulder 22 of the annular extension, as noted in Fig. 10. The inner periphery of the split ring 6 is normally held in a snugly fitted manner around the annular extension so that the ring support may slide around the annular extension but there will be no lost motion between these two bodies. A filler strip 6d aids to yieldably hold the lugs 6b and 6c in their bolted position, shown in Fig. 11.

The central opening 10 in the extension 8 communicates with two T-slots 24 and 26 formed at right angles to one another in the exposed lower surface of the table 2, as viewed in Figs. 9 and 10. Either one, or both, of these agencies may serve to support bolts, or other fastening means, for locking the table 2 against a machine tool or other body, where desired.

Arranged at the opposite side of the ring support 6, which is at the top of the structure shown in Fig. 9, is the plate 4 occurring in a substantially horizontally disposed position. In accordance with the invention the plate is mounted in hinged relationship with the supporting ring 6, as may be more clearly seen from an inspection of Figs. 1, 10 and 12, in order to allow the plate to be swung about a horizontal axis into various positions of angularity. Formed integrally with the ring support 6 is a bearing portion 28 which is provided with a cylindrical bore. The plate 4 is further formed with two hinged sections 30 and 32 having openings formed therethrough corresponding to the cylindrical bore of bearing portion 28 and arranged in axial alignment at either side of the bearing portion 28, as suggested in Fig. 1.

Received within the cylindrical bore of the bearing portion 28 are two cylindrical bushings 34 and 36, the inner peripheries of which are tapered, as illustrated in Figs. 12, 13 and 16. Loosely mounted in the tapered bushings 34 and 36 are two tapered hinge pins 38 and 40, the degree of taper of which, in each case, corresponds to the tapered inner bore of the bushings 34 and 36. Axially disposed through the tapered hinge pins 38 and 40 is an adjustment bolt 42, the extremities of which project beyond the lug portions 30 and 32 and are formed with threads, as 44.

The tapered hinge pins 38 and 40 are constructed with reduced end portions, as 46, which portions are provided with threads 48 having engaged therearound adjustment nuts, as 50 and 52. Interposed between reduced end portions of the tapered hinge pins 38 and 40 and respective lugs 32 and 30, are tubular members 54 and 56, best shown in Figs. 12 and 13, and formed with flanged heads 58 and 60. Pins, as 62 and 64, maintain their respective flanged heads 68 and 60 in fixed relationship against the lugs 30 and 32, and thus prevent rotation of these tubular members therein. As may be more clearly seen from an inspection of Figs. 13 and 14, the tubular members 54 and 56 are formed with internal gear portions, as 66, and these portions are adapted to slidably engage with corresponding gear portions 68 and 70 formed on respective hinge pins 38 and 36, as shown in Figs. 13 and 15. This entire hinge assembly is normally adapted to be held in locked relationship by locking nuts 72 and 74 after the tapered hinge pins have been tightened against their respective tapered bushings by turning adjustment nuts 50 and 52.

The plate 4 can, by means of this arrangement, be held in fixed relationship with respect to the supporting ring 6 in any desired position of angularity. To release the hinge pin assembly the locking nuts 72 and 74 are unthreaded for a short distance and the adjustment nuts 50 and 52 are then turned, for example in a clockwise direction, which causes the hinge pin members which are held against rotation by their splined portions engaging with the internal gears 66, to move outwardly away from adjacent tapered bushing portions. The angle plate is then free to turn and may be swung into any desired position of angularity in the manner suggested in Fig. 2.

In swinging the angle plate into a desired position of angularity, it may be desired to furnish scale means for indicating the arc of rotation through which the plate has been swung. For this purpose I have further provided an angle scale plate 76 which provides a convenient means for measuring, in degrees, a range of angles of, for example, from 0° to 90°, through which the plate 4 may be moved. The scale plate may conveniently consist of a thin metal body of the general shape indicated in Fig. 5, and fitted around the tubular member 54 in a position such that it is securely held between the end of the hinge lug 32 and the flanged head 58, as is more clearly shown in Figs. 12 and 13. Fixed to the annular extension 8 of the table 2 at a point, as indicated in Figs. 2 and 5, is a bracket member 78 which supports, at its upper end, a pointer 80 arranged to register with the scale markings on the plate 76.

Another important feature of the invention comprises a gear mechanism for producing rotation of the plate 4 relative to the table or base member 2, and also rotation of the supporting ring 6 on which the plate 4 is mounted. The gear mechanism is composed of two principal parts, one of which comprises an annular series of teeth 82, Fig. 11, which function in the nature of a worm wheel and which are formed around the outer periphery of the annular extension 8, as suggested in Fig. 11. The second principal part of the gear mechanism referred to above includes a worm member 88 having spiralled edges 86 which project through an opening 84 in the ring support 6, as may be most clearly seen from an inspection of Fig. 17, to engage with the teeth 82. The worm member 88 is carried as an integral part of a worm shaft 90 at the outer end of which is solidly secured a wheel 92 having a handle 94 by means of which the mechanism may be rotated so that the worm 88 may rotate with the ring section 6 around the annular extension 8.

It frequently happens that in rotary angle tables for plates heretofore employed in the art, a certain amount of difficulty arises, or is experienced, in avoiding lost motion which materially affects the accuracy and, hence, the practicality of the work supporting structure when utilized with tool machine operations where a high degree of accuracy must be observed. With this problem in mind I have combined with the split supporting ring structure 6 and bolted end fastening, a special worm bracket assembly which is particularly devised to provide for very fine and accurate adjustments in the setting of the mechanism in desired positions, the object being especially to avoid with equal certainty any play or lost motion in both the hinged pin mechanism for moving the plate about a horizontal axis, on the one hand, and the worm gear mechanism for rotating the plate in whatever angle position it may assume upon the base member.

In this connection attention is directed to the specific worm bracket assembly best shown in Figs. 8 to 11, inclusive. In part this worm bracket assembly is comprised by a front frame piece 96 which may conveniently be formed as an integral part of the supporting ring 6, as shown in Figs. 9 and 11. The end walls of this frame piece 96 are formed with openings 98 and 100. These openings are made sufficiently large to adjustably support bearing members 102 and 104. The bearing members are resiliently supported at their inner sides by spring members 106 and 108 held in recesses 110 and 112 formed in the ring section 6, as shown in Fig. 11. At opposite sides the bearings 102 and 104 are adjustably held against the action of the springs 106 and 108 by means of bolts 116 and 118 which are threaded through the front wall of the frame piece 96 and have their inner extremities forced against adjacent surfaces of the bearings, as shown.

At its right-hand end, as viewed in Fig. 11, the worm shaft 90 is received through a bushing 120 and is provided with an adjustable ball bearing 122 which seats in a recessed end of the worm shaft, as shown. An adjustment bolt 124 holds the ball bearing 122 against the worm shaft extremity. At its opposite end the worm shaft 90 is provided with a bushing 126 and a thrust bearing 128 to resist the thrust of the adjustment bolt 124 and hold the worm shaft in a desired position of adjustment. This permits the worm mechanism to furnish very accurate adjustments.

With the arrangement described it will readily be seen that turning the handle 94 operates to produce a rotation of the worm 88 and thus causes the ring section 8 to rotate, carrying the plate 4 with it without any lost motion at any point. The plate 4 is thereby rotated about an axis outside of itself, and since the plate may be adjusted into any position of angularity with respect to the horizontal, it is possible to move the plate 4 through a wide range of positions of adjustment and, if necessary, the plate can be swung through a full circle of 360° without interference with the remaining part of the structure.

The mounting of the worm 88 between the particular thrust bearing assembly described above is especially devised to permit the bearing members 102 and 104, together with the end plates 140 and 134, to be conveniently moved into a position in which the worm no longer meshes with the teeth 82. The purpose of this is to provide for a quick adjustment or swing of the worm bracket and worm assembly about a substantial section of the annular portion 8 without having to utilize the wheel 94. This type of adjustment may be quickly and conveniently carried out by loosening the bolts 130 and 132 of plate 134, together with bolts 136 and 138 in plate 140.

As noted in Fig. 10 these end plates 134 and 140, of which plate 134 is shown in Fig. 10, are formed with elongated slots, as 142 and 144, through which extend the adjustment bolts 130 and 132. The elongated slots in the end plates, together with the enlarged openings 98 and 100 in which the bearing members 102 and 104 are received, allow these bearing members to be moved away from the position shown in Fig. 11 to a degree determined by backing off the bolts 114 and 116. The worm 88, when disengaged from the teeth 82 by this adjustment can then be freely swung into any desired position with the worm thereafter being forced into engagement with the teeth 82 by tightening the bolts 114 and 116. This whole assembly is then in condition to undergo a secondary adjustment through the wheel 94 in accordance with a desired reading on the wheel scale 150 relative to a vernier scale 152 on the annular member 154 secured about a reduced portion of the member 140 in fixed relation by means of a set screw 156.

In addition to the scale 150 on wheel 92 and the vernier scale 152 I may also provide, in some cases, an additional scale means, as best shown in Fig. 5, to indicate the setting of the ring support 6 with respect to the table 2. Thus, as shown in Fig. 5, the outer peripheral edge of the table 2 may be provided with a scale 158, and arranged to move into register with this scale is a pointer 160 horizontally supported at the bottom of the bracket member 78 earlier described. Supplementing this scale 158 it may also be desired to provide another scale 162 formed along a bevel edge 164 of the annular extension 8, as best shown in Fig. 5. The bracket member 78 may be recessed to support a magnifying lens 166 which permits the eye 168 (Fig. 7) of an observer to conveniently view the position of the ring support relative to the scale readings 162 of the base.

It will readily be seen that with the arrangement described the table 2 can be bolted to a machine tool by bolts in T-slots 24 and 26, and thereafter the plate 4 may be swung through any desired angle about its hinge pin assembly, as suggested in Fig. 2, and work may be attached by bolts received in T-slots 4a. For a required position of angularity of plate 4 thus arrived at, or in any other desired position, work may then be rotated about an axis outside of the plate 4 to carry out a series of progressively located operations on the work.

It is pointed out, however, that there may occur a considerable number of tool operations where adjustments may be further required to be carried out in connection with a work support which not only may be positioned at an angle to the horizontal, as well as being rotated about an axis outside of itself, but which may also be rotated about its own central axis. For such requirements the structure of the invention, as described, is highly applicable. The plate member 4, for example is, in this case, used as a base to be secured to a machine tool by bolts received in the T-slots 4a. The table is then swung on the hinge pin assembly earlier described into some desired position, such as that suggested in Figs. 3 and 4. A work piece may then be secured to the table 2 by bolts in the T-slots 24 and 26 and either one, or both, of two adjustments progressively made, whereby the work is rotated about an axis outside of itself, or about its own central axis. In utilizing the invention in this manner the same accuracy and precision above described may be realized in making any desired adjustment of the parts and an added flexibility feature is, of course, made possible by revolving the member 2 about its own axis.

From the foregoing description it will be evident that I have provided a unique work supporting structure chiefly characterized by a pair of cooperating work holding elements connected together in such fashion that at least one of the elements may be revolved about its own axis through an arc or arcs of movement which can be very precisely controlled. As a result a much greater range and flexibility is made possible in connection with machine tool operations.

While I have shown a preferred embodiment of my invention, it is intended that various changes and modifications may be resorted to in keeping with the scope of the appended claims.

I claim:

1. A work supporting device comprising a work holding element, said work holding element being formed with a cylindrical extension having an annular gear portion formed around the outer periphery thereof, a split ring member mounted for rotation on the cylindrical extension, means for clamping the split ring in locked relationship around the cylindrical extension, a second work holding element mounted at one side of said split ring for hinging about a horizontal axis, a gear member supported at an opposite side of the split ring and extending therethrough into engagement with the annular gear portion on the cylindrical extension.

2. A structure according to claim 1, in which the said gear element consists of a worm, and means for rotating the worm about its longitudinal axis to revolve the split ring member about the said cylindrical extension, the longitudinal axis of the worm lying in the plane of the horizontal axis of hinging of the said second work holding element.

3. A structure according to claim 2, in which the split ring member includes a worm supporting bracket and means for adjusting the work in said bracket and an annular retaining ring overlying the split ring and the worm bracket and detachably secured to the cylindrical extension to define a guideway for movement of the split ring when the latter member is tightened.

4. A structure according to claim 1, in which the split ring member is formed with a bearing portion and means for hinging said second work holding element on said bearing, the means including a tubular member, tubular bushing elements slidably disposed in said tubular member, and means for interlocking the tapered bushings and tubular member with the said second work supporting element.

5. A structure according to claim 1, in which the split ring member is formed with a horizontally extending bearing portion, a pair of spaced-apart hinge sections attached to said second work holding element, a hinge pin assembly adjustably secured through the hinge sections and the said bearing, said hinge pin assembly including a shaft having threaded end portions, a pair of tubular hinge pins mounted about the shaft in opposed relationship, a pair of tapered hinge pin bushings having the tubular hinge pin members slidably received therein, the longitudinal axis of the said gear and the axis of the hinge pin shaft lying in a common horizontal plane, and means for locking the component parts of the said assembly one against another to fix the said second work holding element in a desired position of angularity.

6. In a work supporting structure of the class described, a work supporting element having a cylindrical extension formed at one side thereof, a split ring member rotatably mounted on the cylindrical extension, an angle plate pivotally secured to the split ring member, said tubular extension being formed with annular gear teeth and said split ring member being recessed to provide an aperture which registers with the annular gear teeth, driving means projecting through the aperture to engage the teeth and rotate the split ring and angle plate about the cylindrical extension, and means for simultaneously locking the driving means and split ring member in fixed relationship with respect to the said work supporting element to substantially eliminate lost motion.

7. In a work supporting structure, a work supporting element having a cylindrical body projecting therefrom, a split ring member mounted for rotation around the cylindrical body, and angle plate means for pivotally supporting the angle plate at one side of the split ring member, gear mechanism for revolving the split ring member and angle plate about the cylindrical body, said gear mechanism including gear teeth formed around the periphery of the cylindrical body, and a cooperating worm constructed and arranged in the split ring to extend therethrough and engage the said gear teeth, means for rotating the worm to revolve the split ring about the cylindrical body, and locking means for simultaneously clamping the split ring on the cylindrical body and jamming the worm against the said gear teeth in a position such that lost motion is substantially eliminated.

References Cited in the file of this patent

UNITED STATES PATENTS

| | | |
|---|---|---|
| 425,438 | Lodge | Apr. 15, 1890 |
| 512,668 | Smith | Jan. 9, 1894 |
| 679,413 | Bunker | July 30, 1901 |
| 774,515 | Geier | Nov. 8, 1904 |
| 1,763,711 | Kearney | June 17, 1930 |
| 1,997,916 | Rusnak | Apr. 16, 1935 |
| 2,570,444 | Henkel | Oct. 9, 1951 |
| 2,574,914 | DuBois | Nov. 13, 1951 |
| 2,608,103 | Shonnard | Aug. 26, 1952 |

FOREIGN PATENTS

| | | |
|---|---|---|
| 508,193 | France | Oct. 4, 1920 |